United States Patent [19]
Stolle et al.

[11] Patent Number: 5,724,878
[45] Date of Patent: Mar. 10, 1998

[54] HYDRAULIC OPERATING MECHANISM FOR A CONVERTIBLE TOP

[75] Inventors: Klaus Stolle, Altonstadt; Ulrich Baudermann, Tübingen, both of Germany

[73] Assignees: Hoerbiger GmbH, Schongau; Bara Electronic GmbH, Ammorbach, both of Germany

[21] Appl. No.: 687,197

[22] Filed: Jul. 25, 1996

[30] Foreign Application Priority Data

Aug. 1, 1995 [AT] Austria .................................. 1309/95

[51] Int. Cl.$^6$ .................................. F01B 1/00; B60J 7/00
[52] U.S. Cl. .................................. 91/165; 91/517; 91/518; 91/519; 60/329; 60/426; 296/117
[58] Field of Search .................................. 91/178, 165, 519, 91/517, 518, 459; 60/329, 420, 426; 296/107, 117

[56] References Cited

U.S. PATENT DOCUMENTS

| | | | |
|---|---|---|---|
| 4,798,050 | 1/1989 | Nakamura et al. | 91/419 X |
| 5,138,838 | 8/1992 | Crosser | 60/426 X |
| 5,182,908 | 2/1993 | Devier et al. | 60/420 |
| 5,394,696 | 3/1995 | Eich et al. | 91/459 X |
| 5,564,274 | 10/1996 | Denbraber et al. | 91/419 X |

FOREIGN PATENT DOCUMENTS 3826789   2/1990   Germany .................................. 296/117

*Primary Examiner*—Hoang Nguyen
*Attorney, Agent, or Firm*—Watson Cole Stevens Davis, P.L.L.C.

[57] ABSTRACT

In a hydraulic operating mechanism for a convertible top, a pressure sensor (12) is incorporated into a common pressure circuit (P) of the hydraulic cylinders (1 through 4) and connected with a control unit which is connected to the switching elements (V1 through V4) of the hydraulic cylinders (1 through 4), and its output signal in relation to time, together with the preset switching sequences of the individual switching elements (V1 through V4), serves to control the end positions of the individual hydraulic cylinders (1 through 4). The control can thus be incorporated in the operating mechanism without expensive separate end position switches at each hydraulic cylinder (1 through 4) or appurtenant actuation element, simplifying the overall design.

5 Claims, 2 Drawing Sheets

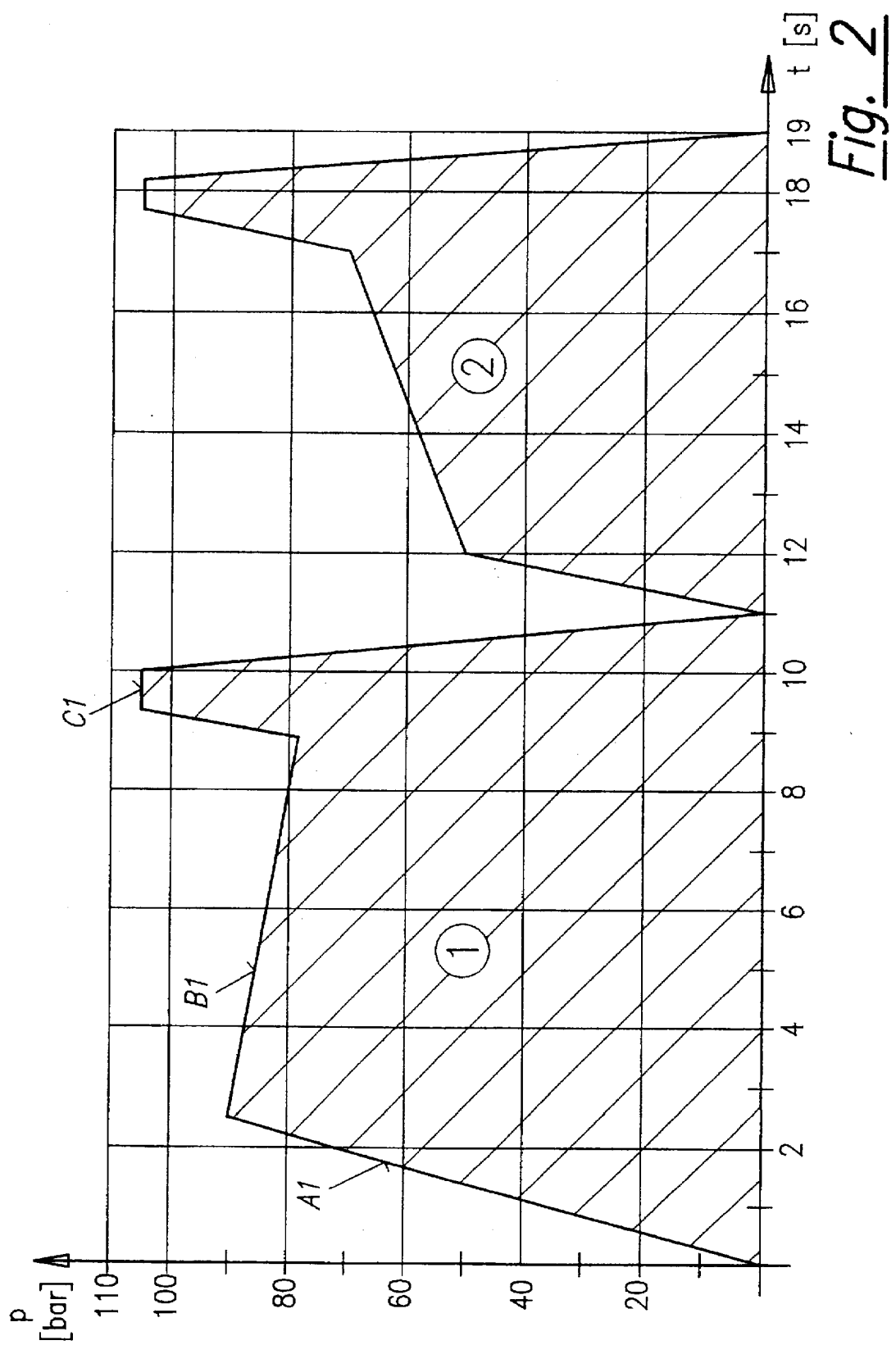

HYDRAULIC OPERATING MECHANISM FOR A CONVERTIBLE TOP

BACKGROUND OF THE INVENTION

1. Field of the Invention

The invention relates to a hydraulic operating mechanism for a convertible top which has a number of hydraulic cylinders connected to a common pressure circuit via separate switching elements, a control unit connected to the switching elements, and at least one feedback unit also connected to the control unit for the end position control of the hydraulic cylinders.

2. The Prior Art

Known operating mechanisms of the noted type generally have the same functional design wherein the sequence of the convertible top operation is controlled by means of valves through the control unit. Controlling the valve switching elements at the proper time and in the proper sequence requires feedback in the form of position signals from the elements of the convertible top operating mechanism, whereby these position signals are commonly generated through appropriate switches on the convertible top or through the operation of the convertible top, and are generally installed on the hydraulic cylinders themselves. These designs are very expensive in terms of their production, assembly and maintenance since at least two end signals (hydraulic cylinders extended/hydraulic cylinders retracted) are required for each phase of the operation, or for each hydraulic cylinder that generates such a phase of the operation, which, in the designs customarily used in these systems requires, for example, two separate end position switches on the respective hydraulic cylinders. Appropriate plugs, cables, etc., are required in addition and also need to be installed which, together with the number of additionally required control inputs at the control unit, increases the number of required parts and naturally also increases the susceptibility of the operating mechanism to failure and damage.

It is the aim of the invention to provide an improved hydraulic operating mechanism of the above type wherein the discussed disadvantages of the known designs are avoided and a design is provided that is more cost effective relative to production, assembly and maintenance without loss of reliability.

SUMMARY OF THE INVENTION

This aim is achieved with an operating mechanism of the above kind according to the invention using a feedback unit having at least one pressure sensor incorporated into the pressure circuit, the output signal of which, in relation to time, together with the pre-set switching sequences of the individual switching elements, serves to control the end position of the individual hydraulic cylinders. This means that, in principle, all that is required is a pressure sensor incorporated into the pressure circuit of the hydraulic cylinders of the operating mechanism to monitor the pressure sequence in this pressure circuit. Each operating mechanism has, in its operating mode, a pressure sequence that depends on the predetermined switching sequences and the installed components and takes virtually the same amount of time during each operation. This means that, for example, the next required phase of the operating sequence of the mechanism can be controlled through a measured pressure increase at the end of the upstroke of a hydraulic cylinder. Each sequential phase may additionally be controlled by monitoring the operating time since, in its operational mode, each hydraulic cylinder should be fully extended after a certain amount of time. By eliminating the many individual end position switches on the operating mechanism of the convertible top or on the hydraulic cylinders themselves, the components of the operating mechanism can be produced at a significantly reduced cost and the entire operating mechanism is simplified. Assembly in the vehicle is also more cost effective, simpler and less prone to failure since fewer cables and plugs need to be installed. The control unit is fully functional with a significantly lower number of control inputs. The reliability is furthermore significantly increased over that of the described known operating mechanisms since the pressure is continuously monitored and larger pressure variations have an immediate effect on the convertible top opening or closing sequence.

A further preferred design of the invention includes a computer in the control unit for the purpose of monitoring and evaluating the pressure sequence, this computer also controlling the operating sequence of the switching elements. Monitoring of the pressure sequences and their translation into the actuation of switching sequences thus becomes very simple, and making changes for the purpose of adapting the mechanism to different situations is easy.

According to a further, particularly preferred design of the invention, at least one temperature sensor, through which the temperature-dependent characteristic line of the operating mechanism can be taken into consideration in the control of the sequence, is provided in or at least near the pressure circuit and also connected with the control unit. Since the duration of the movement of the respective hydraulic cylinder from one position to the other depends on the hydraulic volume flow which, in turn, depends on the temperature, a simple compensation may thus be performed, and two independent parameters are obtained with which the control of the operating sequence may be reliably performed.

It is obvious, of course, that additional safety switches, end switches, etc., may be installed independently from or in addition to the described control of the hydraulic operating mechanism of the convertible top, that could serve, for instance, to monitor the final attainment of the end position of the convertible top.

The invention will be further explained in the following discussion in conjunction with the attached drawings.

BRIEF DESCRIPTION OF THE DRAWINGS

FIG. 2 shows a segment of an appurtenant pressure diagram.

DETAILED DESCRIPTION OF THE PREFERRED EMBODIMENT

Figure 1:
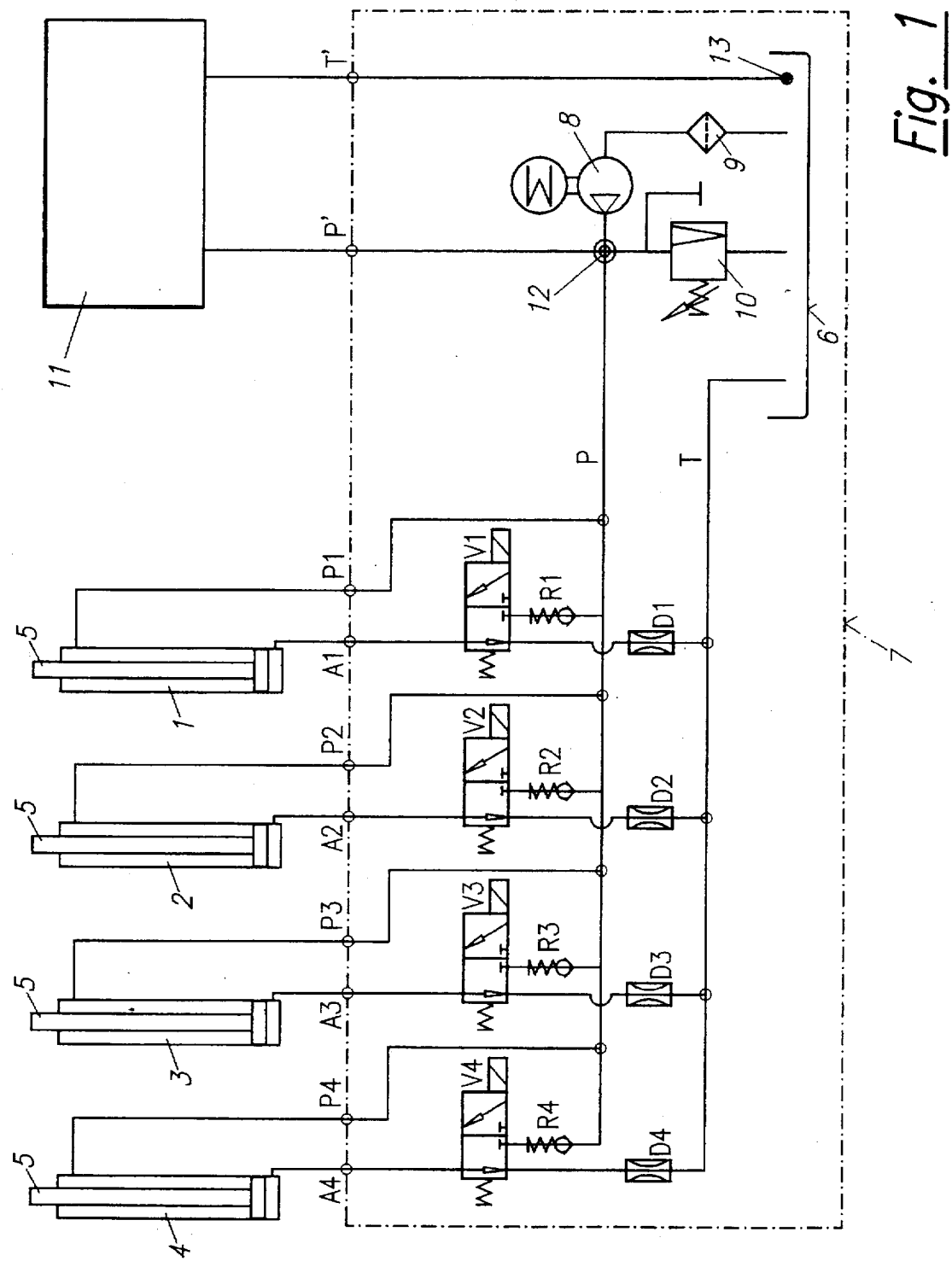
FIG. 1 shows a schematic switching diagram of an operating mechanism according to the invention.

The four separate hydraulic cylinders 1 through 4 shown in FIG. 1 serve to actuate the convertible top in a manner not shown in the drawing, whereby the piston rods 5 extending from the top of the hydraulic cylinders are connected with actuation elements, blocking elements, etc., of the convertible top in a fashion also not shown in the drawing, or for example with a recessed area provided on the vehicle to receive the open convertible top, etc. The hydraulic cylinders 1 through 4 are connected to a common pressure circuit P (connections P1 through P4) via separate switching elements V1 through V4, or through separate flow restrictors D1 through D6 via the piping T to the tank 6, respectively. The connections of the hydraulic cylinders 1 that are hocked up directly to the switching elements V1 through V4 are marked as A1 through A4.

For the sake of completeness, reference is hereby also made to the recoils R1 through R4 in the connection from the pressure circuit P to the switching elements V1 through V4, whereby the latter are spring-loaded on the one hand and electrically actuated on the other hand.

The unit block 7 shown in a dotted line in FIG. 1, in addition to the switching elements, recoils and appropriate connection lines, also contains the pressure pump 8 with the filter 9, as well as a pressure limiting valve 10 that redirects excessive pressure to the tank 6.

Apart from the above connections A1 through A4 and P1 through P4, the unit block 7 also has exits marked as P' and T' which are connected with an external control unit 11. The exit P' sends the output signal of a pressure sensor incorporated into the pressure circuit to the control unit 11. The exit T', in turn, sends the output signal of a temperature sensor 13 (installed inside tank 6 in this design) to the control unit 11, whereby the control unit is also connected with the electrical actuation elements of the switching elements V1 through V4 in a fashion not shown in the drawing.

A computer, which is not shown in the drawing, is installed in the control unit 11 to monitor and evaluate the pressure sequence of the pressure sensor 12, whereby the computer also controls the switching sequences of the switching elements V1 through V4. The output signal of the pressure sensor 12 in relation to time, together with the predetermined switching sequences of the individual switching elements V1 through V4, serves to control the end position of the individual hydraulic cylinders 1 through 4. The temperature-dependent characteristic line of the operating mechanism can be taken into consideration in the control of the operating sequence through the temperature sensor 13.

At the beginning of an actuation process, all hydraulic cylinders 1 through 4 are retracted, as shown in FIG. 1, for example, and none of the switching elements V1 through V4 are energized. When the unit block or the pressure pump 8, respectively, are turned on, the switching element V1 simultaneously moves into the other switching position not shown in the drawing, so that the hydraulic cylinder 1 extends. The pressure in the pressure circuit P is measured through the pressure sensor 12 and processed by the computer of control unit 11, whereby the actual pressure is compared to a target pressure with a known sequence in relation to time. FIG. 2 shows that the pressure in the hydraulic cylinder 1 rises during the first phase until the cylinder moves (A1 in FIG. 2). The hydraulic cylinder then extends and the pressure moves along B1 in FIG. 2, depending on the load. After the hydraulic cylinder has reached the end of the upstroke (or a corresponding limit stop in the convertible top), the pressure monitored through pressure sensor 12 rises again until it has reached the level predetermined by the pressure limiting valve (reference number 10 in FIG. 2) at C1 in FIG. 2. The control system is therefore able to detect, based on the pressure sequence in relation to time, that the hydraulic cylinder 1 has reached its end position.

The hydraulic cylinder 2 can then be activated or its movement controlled in a similar fashion, etc., for example as shown in FIG. 2.

The depicted and discussed control system can activate a number of different hydraulic cylinder arrangements. The activation of the hydraulic cylinders themselves may be differential or one-way for all characteristic pressure lines. To ensure reliable detection of the end of the upstroke or the end position of the cylinders, respectively, an appropriate difference in pressure between the maximum pressure in the hydraulic cylinder and the opening pressure of the pressure limiting valve 10, must exist of course, depending on the sensitivity of the pressure sensor.

The temperature sensor 13 preferably measures the temperature of the oil in the described fashion since the same has an immediate effect on the characteristic line of the unit block or the overall operating mechanism, respectively. However, the temperature sensor 13 could also be mounted on the board of the control unit 11 itself, provided the control unit 11 is also exposed to these temperature fluctuations. The pressure sensor 12 must be incorporated into the switching circuit in manner so that it can sense all pressure ranges from the hydraulic cylinders 1 through 4, whereby the pressure sensor is preferably incorporated directly into the P-line as shown.

End switches, safety switches, etc., not shown in the drawing may additionally also be installed in suitable places on the convertible top or on the vehicle, for example, to separately signal to the control unit 11 the complete opening or closing of the convertible top.

We claim:

1. A hydraulic operating mechanism for a vehicle convertible top comprising a plurality of hydraulic cylinders (1–4) connected to a common pressure circuit (p) via separate switching elements (V1–V14), a control means (11) connected to the switching elements for controlling operation thereof according to a predetermined sequence, and a feedback unit connected to the control means for the end position control of the hydraulic cylinders, said feedback unit including at least one pressure sensor (12) incorporated into said pressure circuit, an output signal of which in relation to time, together with predetermined switching sequences of said separate switching elements, serves to control end position of said hydraulic cylinders.

2. A hydraulic operating mechanism according to claim 1, including a computer for monitoring and evaluating the pressure sequence in said control unit, the computer also controlling said switching sequences of said switching elements.

3. A hydraulic operating mechanism according to claim 1, including a temperature sensor (13) installed adjacent said a temperature-dependent characteristic line of said operating mechanism can be taken into consideration in controlling said operating sequence.

4. A hydraulic operating mechanism according to claim 3, wherein said temperature sensor is connected into said pressure circuit.

5. A combination of a vehicle having a convertible top which can be raised and lowered by a plurality of hydraulic cylinders (1–4) connected to a common pressure circuit (p) via separate switching elements (V1–V4), a control means (11) connected to the switching elements for controlling operation thereof according to a predetermined sequence, and a feedback unit connected to the control means for the end position control of the hydraulic cylinders, said feedback unit including at least one pressure sensor (12) incorporated into said pressure circuit, an output signal of which in relation to time, together with predetermined switching sequences of said separate switching elements, serves to control end positions of said hydraulic cylinders.

* * * * *